Patented Aug. 27, 1940

2,212,590

UNITED STATES PATENT OFFICE 2,212,590

AZO DYESTUFFS

Detlef Delfs, Dusseldorf, and Richard Stüsser, Cologne, Germany, assignors to General Aniline & Film Corporation, a corporation of Delaware.

No Drawing. Application March 24, 1939, Serial No. 263,892. In Germany March 30, 1938

9 Claims. (Cl. 260—143)

The present invention relates to new azo dyestuffs and to a method of preparing the same; more particularly it relates to azo dyestuffs which are conversion products of nitromonoazo dyestuffs.

It has been found that valuable substantive azo dyestuffs are obtained, if two molecular proportions of an azo dyestuff of the general formula

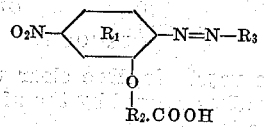

in which —$OR_2 \cdot COOH$ means the residue of an $\alpha$-hydroxycarboxylic acid and $R_3$ the radical of a hydroxy compound of the naphthalene series bearing the hydroxy group in ortho-position to —N=N— bridge and $R_1$ may be further substituted, are connected by converting the nitro group according to known methods.

The starting components of the present process are prepared, for instance, by coupling the diazo compound of amines of the formula

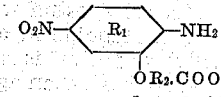

with hydroxy compounds of the naphthalene series in such a way that the entrance of the diazo group takes place in ortho-position to the hydroxy group. The hydroxy compounds of the naphthalene series may bear any substituents, for instance, solubilizing groups such as carboxylic or sulfonic groups, hydroxy, alkoxy, amino groups, substituted amino groups, azo groups, halogen. $R_1$ may be further substituted, for instance, by halogen, alkyl, alkoxy and sulfonic groups. The group —$OR_2 \cdot COOH$ represents the radical of an $\alpha$-hydroxy-carboxylic acid such as the hydroxyacetic acid or the lactic acid. The following compounds may, therefore, for instance, be employed as diazo compounds for the synthesis of the starting components:

5-nitro-2-aminophenoxy-acetic acid
5-nitro-2-aminophenoxy-propionic acid
5-nitro-4-methyl-2-aminophenoxy-acetic acid
5-nitro-4-methoxy-2-aminophenoxy-acetic acid
5-nitro-4-chloro-2-aminophenoxy-acetic acid
5-nitro-2-aminophenoxy-acetic acid-4-sulfonic acid.

Now our new dyestuffs are obtained by connecting two molecular proportions of any of the above described azo dyestuffs by conversion of the nitro group according to known methods. This is effected, for instance, by reducing the nitro groups with formation of an azo or an azoxy group by means of grape sugar or its equivalents, such as arsenous acid in alkaline medium. Another method of effecting this connection consists in reducing the nitro group to the amino group and in subsequently uniting two of these amino groups by means of phosgene, thiophosgene, carbon disulfide to ureas or thioureas, or by means of cyanuric chloride or chlorides or dicarboxylic acids. The amino group obtained by reducing the nitro group may also be condensed with such compounds which again contain a nitro group, as for instance the nitrobenzoyl chlorides and the nitrophenylisocyanates, and the dyestuffs thus obtained may be connected according to any of the above mentioned processes.

The dyestuffs obtained according to the present process possess very good affinity to cellulosic fibers and are especially distinguished by the property of their dyeings to become improved in the fastness to washing and light by an aftertreatment with metal salts, especially copper salts, the shades of the dyeings being not much changed in general by the aftertreatment.

The following examples illustrate the invention without, however, restricting it thereto, the parts being by weight.

Example 1

115 parts of the dyestuff which is obtained by coupling diazotized 5-nitro-2-amino-phenoxy-acetic acid and 2-phenylamino-5-hydroxynaphthalene-7-sulphonic acid in alkaline medium, are dissolved in 5000 parts of water and heated to 70° C. Now 100 parts of 35% sodium hydroxide solution are added and thereupon at 70–72° C. the solution of 35 parts of glucose in 200 parts of water is allowed to run in. The mixture is stirred for 20 minutes at 72–74° C. and the disazoazoxy dyestuff thus formed is isolated. It probably corresponds in the free state to the following formula:

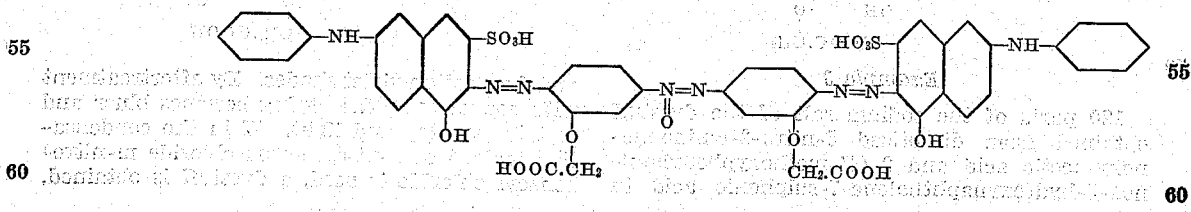

and dyes cotton and regenerated cellulose from the Glauber's salt soda-bath clear blue shades. The fastness to washing and light of the dyeings is essentially improved by an aftertreatment with copper salts.

If instead of 5-nitro-2-amino-phenoxy-acetic acid the 5-nitro-2-aminophenoxypropionic acid is used likewise a blue dyestuff is obtained. Instead of 2-phenylamino-5-hydroxy-naphthalene-7-sulphonic acid other hydroxy compounds of the naphthalene series may be employed: with 2-hydroxynaphthalene-6-carboxylic acid a dyestuff is obtained which dyes cotton navy blue.

alkaline medium, are dissolved in 1500 parts of water and the solution of 75 parts of crystallized sodium sulphide in 300 parts of water is added with stirring. The mixture is heated for 5 hours to 80° C. with stirring and the aminoazo dyestuff thus formed is isolated by acidifying with dilute acetic acid. The dyestuff is dissolved in 5000 parts of water and 1500 parts of 10% sodium carbonate solution. Into the filtered solution phosgene is passed at 20–25° C. with stirring. The new dyestuff precipitates and is isolated by pressing. It corresponds in the free state to the following formula:

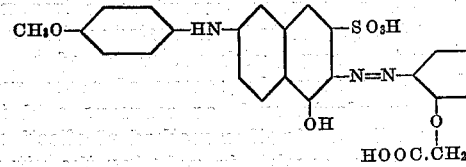
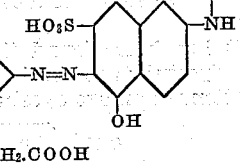

Example 2

100 parts of the sodium salt of the azo dyestuff obtained from diazotized 5-nitro-2-aminophenoxy-acetic acid and 2-hydroxynaphthalene-6-sulphonic acid are stirred with 3000 parts of water at 40° C. and a solution of 75 parts of crystallized sodium sulphide in 300 parts of water is added. The mixture is heated for 5 hours to 80° C. with stirring and then the aminoazo dyestuff is separated by gradually adding a 5% hydrochloric acid. The dyestuff is filtered with suction and thereupon again dissolved at 20° C. in 8000 parts of water containing sodium carbonate. After adding 1500 parts of a 10% sodium carbonate solution phosgene is passed in with vigorous stirring until the dyestuff is completely precipitated as urea derivative. The new dyestuff which corresponds in its free state to the following formula:

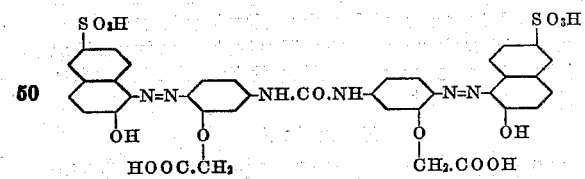

dyes cellulosic fibres clear reddish-violet shades and becomes fast to washing and light by aftertreatment with copper salts.

The 2-hydroxynaphthalene-6-sulphonic acid may be replaced by other hydroxynaphthalene-sulphonic acids. When using, for instance, 1-hydroxynaphthalene-3- or 4-sulphonic acid or 2-hydroxynaphthalene-4-sulphonic acid likewise violet cotton dyestuffs are obtained.

Example 3

120 parts of the sodium salt of the dyestuff obtained from diazotized 5-nitro-2-aminophenoxy-acetic acid and 2-(4'-methoxyphenylamino)-5-hydroxynaphthalene-7-sulphonic acid in and dyes the vegetable fibre clear violet shades which are hardly changed by the aftertreatment with copper salts.

When replacing 5-nitro-2-aminophenoxyacetic acid by 5-nitro-4-methyl- or 5-nitro-4-chloro-2-aminophenoxy-acetic acid similar dyestuffs of somewhat reduced solubility are obtained.

Example 4

582 parts of the sodium salt of the dyestuff obtained from diazotized 5-nitro-2-aminophenoxy-acetic acid and 2-phenylamino-5-hydroxynaphthalene-7-sulphonic acid in alkaline medium, are reduced to the aminoazo dyestuff with 420 parts of crystallized sodium sulphide in aqueous solution at 60–70° C. This dyestuff is salted out and preferably once re-dissolved, then again dissolved in water and sodium carbonate and in sodium-carbonate alkaline solution allowed to react with excess finely pulverized p-nitrobenzoyl chloride at 50–60° C., while stirring well, until an acidified test-portion no longer reacts with sodium nitrite. The p-nitrobenzoylaminoazo dyestuff precipitates and is filtered with suction. In order to purify the dyestuff it may be redissolved. By reduction with sodium sulphide as stated above the nitro group is converted into the amino group and the p-aminobenzoylaminomonoazo dyestuff is salted out, filtered off and re-dissolved. By passing phosgene into the aqueous sodium carbonate alkaline solution of the dyestuff the urea derivative is obtained. The urea formation is complete, when no longer a free amino group can be detected by diazotizing and coupling with R-salt. The dyestuff is filtered off and dried. It is a dark powder, corresponding in the free state to the following formula

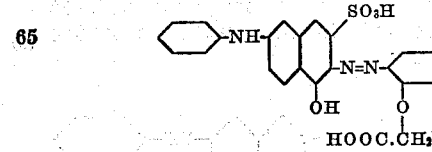
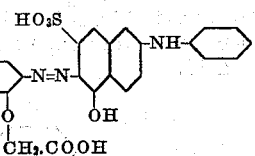

and dyes cotton violet shades. By aftertreatment with copper salts the dyeing becomes bluer and fast to washing and light. If in the condensation instead of p-nitrobenzoyl chloride m-nitrobenzoyl chloride is used, a dyestuff is obtained.

which dyes cotton somewhat redder shades, while the aftercoppered dyeing shows the same fastness properties.

*Example 5*

If in Example 4 2-phenylamino-5-hydroxynaphthalene 7-sulphonic acid is replaced by 2-hydroxynaphthalene-8-sulphonic acid a dyestuff is obtained which corresponds in the free state to the following formula:

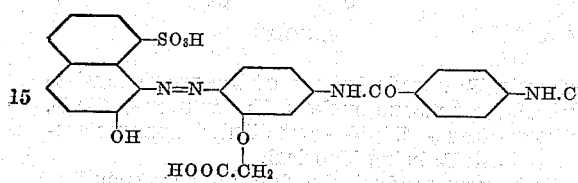

and dyes cotton bluish-red shades. By aftertreatment with copper salt the dyeing becomes faster to washing and light.

*Example 6*

By coupling diazotized 5-nitro-2-amino-phenoxy-acetic acid (212 parts) with the sodium salt of 2-(3'-carboxyphenylamino)-5-hydroxynaphthalene-7-sulphonic acid (403 parts), reducing the nitro group to the amino group and condensing the amino group with p-nitrobenzoyl chloride a p-nitrobenzoylaminoazo dyestuff is obtained which corresponds in the free state to the following formula:

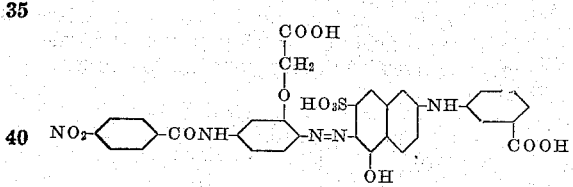

Two molecules of this dyestuff are connected to an azoxy disazo dyestuff or to an trisazo dyestuff by reducing the nitro groups by means of grape sugar to the azoxy- or azo group. The dyestuff corresponds in the free state to the following formula:

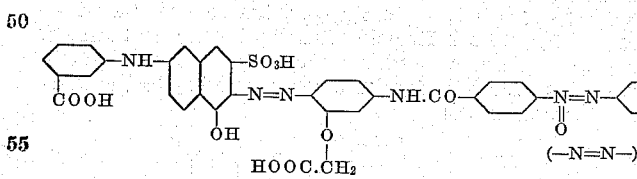

and dyes cotton violet shades. By aftertreatment with copper salts the dyeing becomes bluer and faster to washing and light.

The copper compound of this dyestuff, when prepared in substance, is soluble in water and dyes cotton and viscose violet shades.

We claim:

1. As new products conversion products of nitro-monoazo dyestuffs corresponding to the general formula

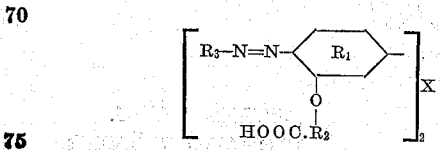

wherein —$OR_2$.COOH stands for the radical of an α-hydroxy-carboxylic acid selected from the group consisting of hydroxy-acetic acid and α-hydroxy-propionic acid, $R_1$ stands for one of the group consisting of the benzene nucleus, the halogen-, alkyl-, alkoxy- and —$SO_3H$— substituted benzene nucleus, $R_3$ stands for the radical of a hydroxy compound of the naphthalene series bearing the hydroxy group in ortho-position to the —N=N— bridge and X, containing the nitrogen atoms of the two nitro groups, stands for one of the group consisting of

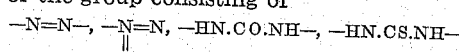

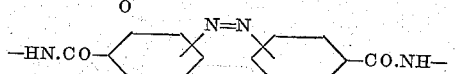

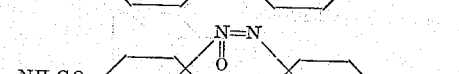

and

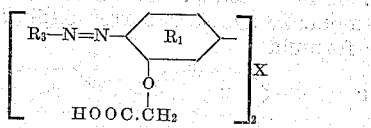

2. As new products conversion products of nitro-monoazo dyestuffs corresponding to the general formula

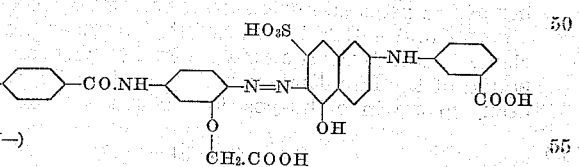

wherein $R_1$ stands for one of the group consisting of the benzene nucleus, the halogen-, alkyl-, alkoxy- and —$SO_3H$— substituted benzene nucleus, $R_3$ stands for the radical of a hydroxy compound of the naphthalene series bearing the hydroxy group in ortho-position to the —N=N— bridge and X, containing the nitrogen atoms of the two nitro groups, stands for one of the group consisting of

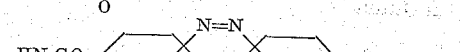

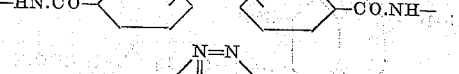

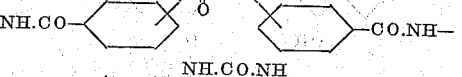

and

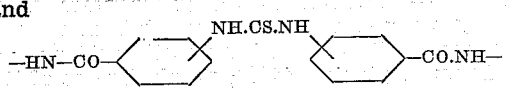

3. As new products conversion products of nitro-monoazo dyestuffs corresponding to the general formula

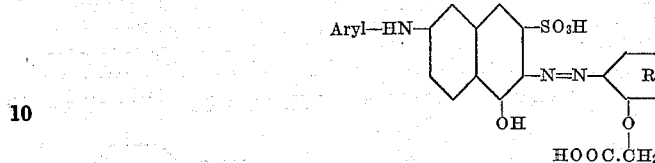

wherein $R_1$ stands for one of the group consisting of the benzene nucleus, the halogen-, alkyl-, alkoxy- and —$SO_3H$— substituted benzene nucleus, $R_3$ stands for the radical of a hydroxy compound of the naphthalene series bearing the hydroxy group in ortho-position to the —N=N— bridge, both $R_1$ being identical and also both $R_3$.

4. As new products conversion products of nitro-monoazo dyestuffs corresponding to the general formula

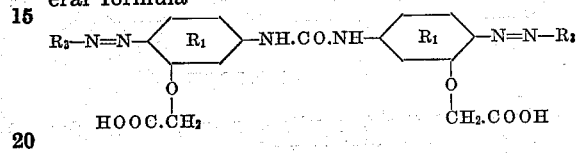

wherein $R_1$ stands for one of the group consisting of the benzene nucleus, the halogen-, alkyl-, alkoxy- and —$SO_3H$— substituted benzene nucleus, $R_3$ stands for the radical of a hydroxy compound of the naphthalene series bearing the hydroxy group in ortho-position to the —N=N— bridge, both $R_1$ being identical and also both $R_3$.

5. As new products conversion products of nitro-monoazo dyestuffs corresponding to the general formula

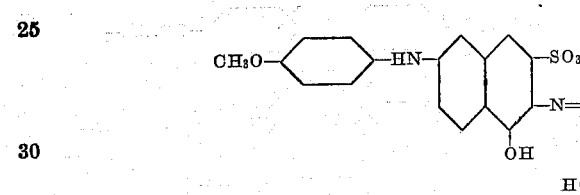

wherein $R_1$ stands for one of the group consisting of the benzene nucleus, the halogen-, alkyl-, alkoxy- and —$SO_3H$— substituted benzene nucleus, both $R_1$ being identical.

6. As new products conversion products of nitro-monoazo dyestuffs corresponding to the general formula

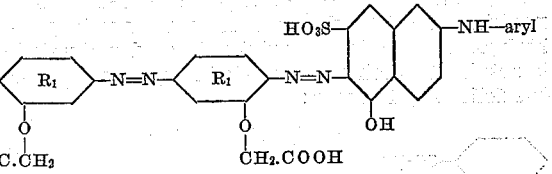

wherein $R_1$ stands for one of the group consisting of the benzene nucleus, the halogen-, alkyl-, alkoxy- and —$SO_3H$— substituted benzene nucleus, both $R_1$ being identical.

7. As new product the dyestuff corresponding in its free state to the formula

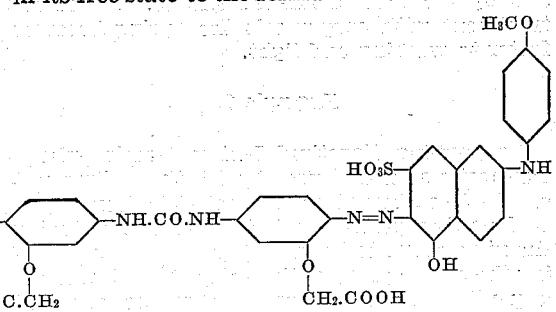

dyeing the vegetable fiber clear violet shades, the fastness to washing and light of which becomes improved by an after-treatment with copper salts.

8. As new products conversion products of nitro-monoazo dyestuffs corresponding to the general formula

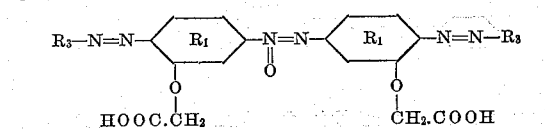

wherein $R_1$ stands for one of the group consisting of the benzene nucleus, the halogen-, alkyl-, alkoxy- and —$SO_3H$— substituted benzene nucleus, $R_3$ stands for the radical of a hydroxy compound of the naphthalene series bearing the hydroxy group in ortho-position to the —N=N— bridge, both $R_1$ being identical and also both $R_3$.

9. As new products conversion products of nitro-monoazo dyestuffs corresponding to the general formula

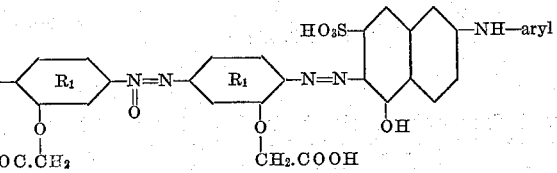

wherein $R_1$ stands for one of the group consisting of the benzene nucleus, the halogen-, alkyl-, alkoxy- and —$SO_3H$— substituted benzene nucleus, both $R_1$ being identical.

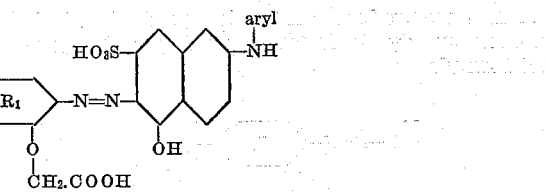

DETLEF DELFS.
RICHARD STÜSSER.